Sept. 17, 1940.  S. W. MATHIAS  2,215,270
WORK HOLDING DEVICE
Filed April 1, 1938  2 Sheets-Sheet 1
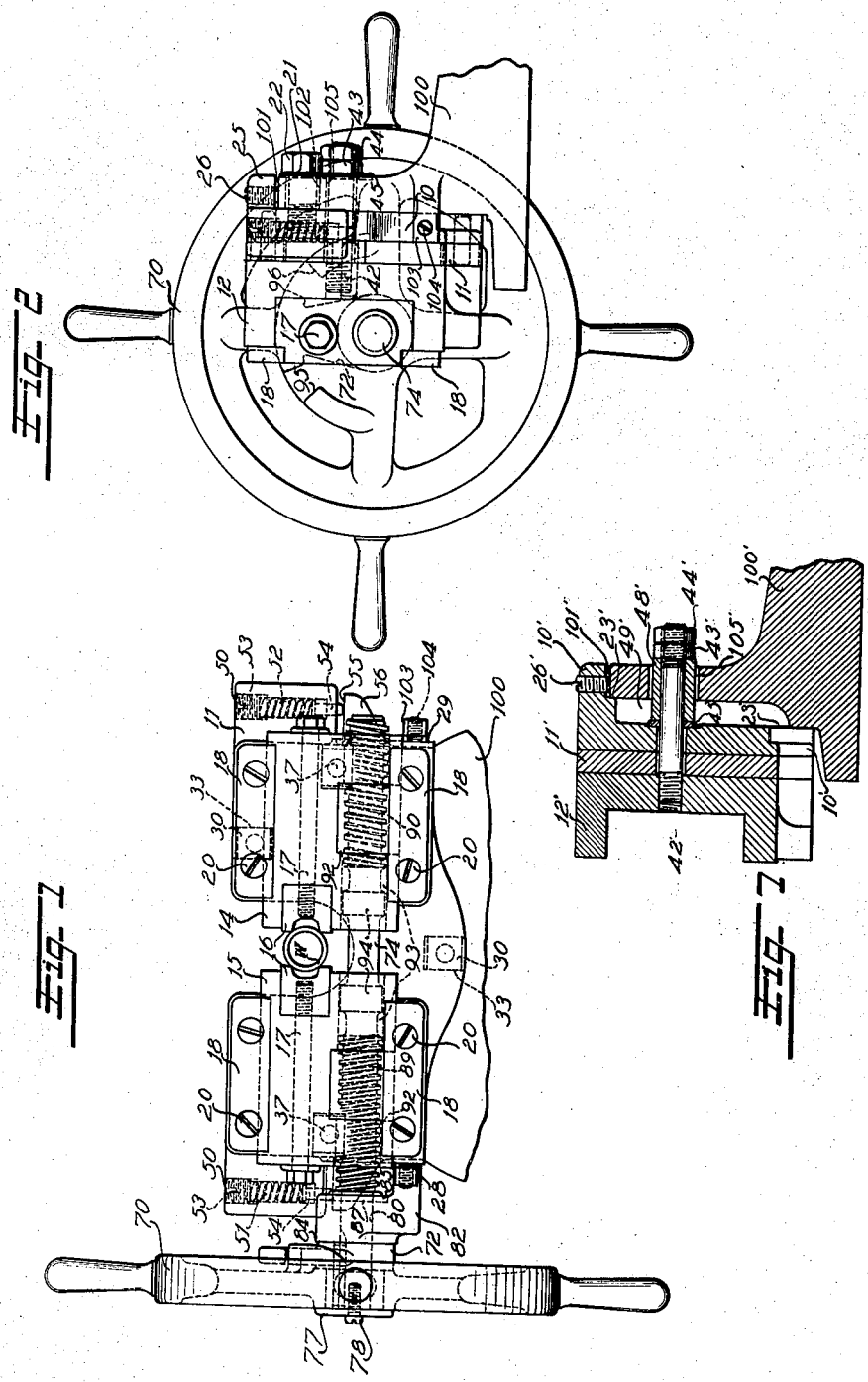
INVENTOR.
Samuel W. Mathias
BY Strauch & Hoffman
ATTORNEY'S Sept. 17, 1940.   S. W. MATHIAS   2,215,270
WORK HOLDING DEVICE
Filed April 1, 1938   2 Sheets-Sheet 2
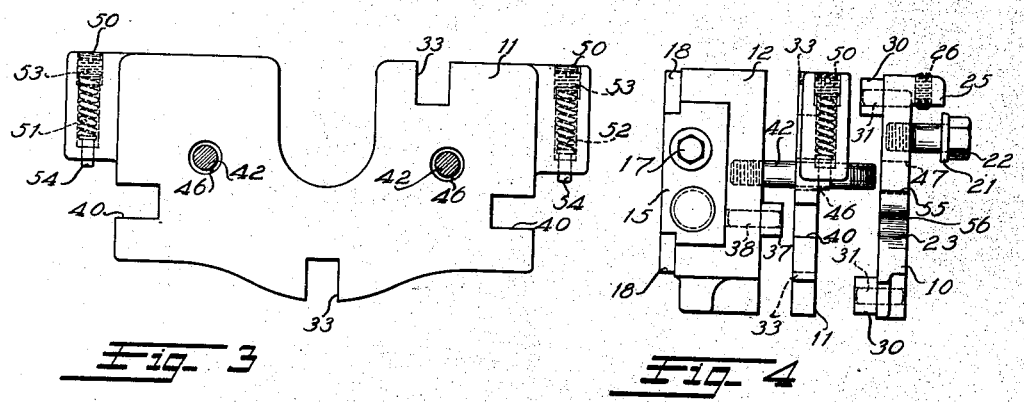
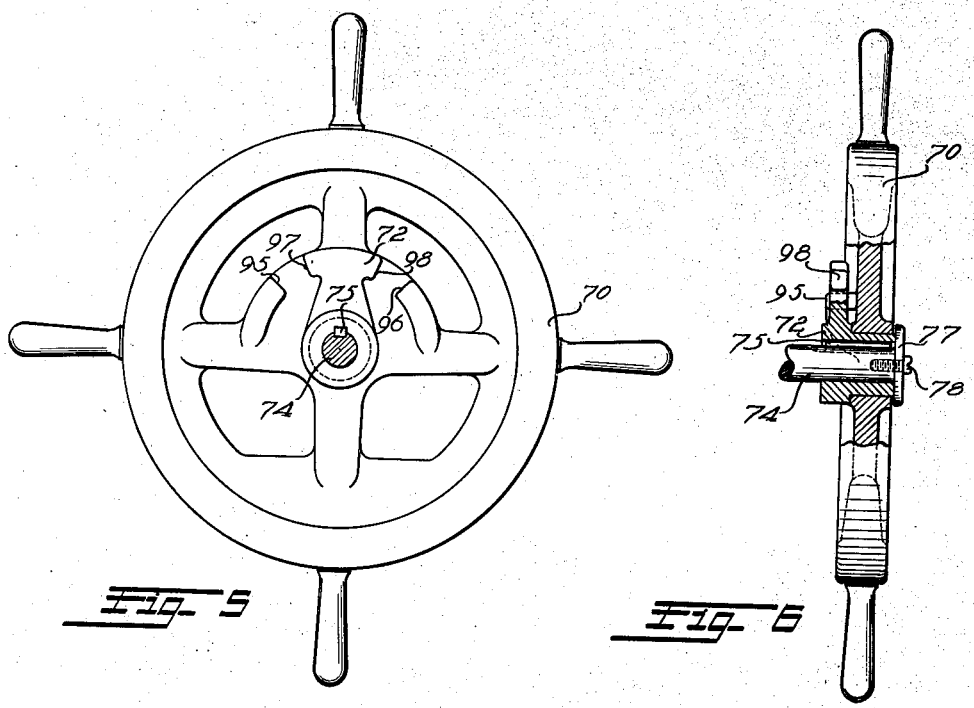
INVENTOR.
Samuel W. Mathias
BY Strauch & Hoffman
ATTORNEYS Patented Sept. 17, 1940

2,215,270

UNITED STATES PATENT OFFICE 2,215,270

WORK HOLDING DEVICE

Samuel W. Mathias, Waynesboro, Pa., assignor to Landis Machine Company, Waynesboro, Pa., a corporation of Pennsylvania Application April 1, 1938, Serial No. 199,527

16 Claims. (Cl. 10—107)

This invention relates to a work holding device or "chuck" and particularly to a mechanism of this kind adapted to be used in connection with a machine tool, such as a threading machine or the like.

In threading machines of the type considered here, the work piece is held against rotation by means of a work holding device mounted on a carriage which is movable to and from a rotating thread-cutting head or similar tool. When threading articles such as bolts, pipe nipples, and similar products, it is desirable to mount the work holding device so that it can have a slight self-aligning movement with respect to the rotating thread-cutting tool. Such self-aligning action is necessary and desirable to the end that a perfectly concentric thread may be cut on the exterior, or interior, of the work piece and, also, in order that stresses may not be imposed upon the cutting device due to a slight misalignment of the work piece with respect thereto.

In work holding devices of this character the jaw elements which clamp the work are generally operated by a rotatable cam means, such as a right and left-hand lead screw, which is rotated in one direction or the other to open or close the jaws. In order that the work may be securely held against rotation during thread-cutting operation, the jaws are firmly clamped thereon by means of a tight turning up of the lead screw. This tight clamping of the lead screw renders the release of the jaws somewhat difficult, as the machine operator is quite likely to apply considerable physical force to the lead screw in order to insure that the work will not slip or move during said cutting operation. It is, therefore, desirable that some means be provided for readily releasing the mechanism even after it has been clamped upon the work with unusual firmness. The present invention is, therefore, concerned with an improved operating mechanism for a work holding device which makes it possible to release the work piece with very great facility regardless of the degree of tightness with which the jaws have been closed upon said work piece. Such a means obviously will render the operation of the work holding device much more efficient and will also produce a considerable saving of time and physical effort on the part of the operator.

Accordingly, it is a principal object of this invention to provide an improved work holder which is self-centering with respect to the rotating tool and which is also provided with an improved gripping mechanism permitting ready release of the work piece.

It is also an object of this invention to provide an improved work holder comprising a plurality of relatively movable elements which are arranged to provide a rigid support for the work clamping jaws and at the same time to have a self-centering action.

A further object of this invention is to provide an improved work holding device of the character set forth in the preceding paragraphs wherein the movable elements are resiliently mounted with respect to a supporting carriage.

A further object of this invention is to provide an improved work holding device in which the operating mechanism is arranged to impart an impact or torsional surge to an operating screw, or the like, so that the jaws may be readily released.

A still further object of this invention is to provide an improved work holding device including relatively movable jaw elements and an operating means therefor wherein the operating means is adapted to store up considerable energy so that the jaws may be readily released after firm clamping upon a work piece.

Another object of this invention is to provide an improved work holding device including opposed clamping jaw members and a lead screw for operating said jaw members together with a manual operating means for said lead screw including a weighted wheel and a lost motion mechanism for connecting said wheel to said lead screw.

It is also an object of this invention to provide an improved work holding device which embodies a self-centering action and an impact operating device which is readily adaptable to the work carriages of existing thread-cutting machines, and is simple to make and easy to install, not requiring any modification of existing threading machines.

The foregoing ancillary objects will become apparent from a study of the following detailed description of a preferred embodiment of my invention when considered in connection with the appended claims and accompanying drawings wherein;

Figure 1 of the drawings is a front view of a work holding device or chuck embodying this invention mounted on the carriage of a conventional metal working machine;

Figure 2 is an end view of the assembly shown in Figure 1;

Figure 3 is a front view of the middle plate of the chuck shown in Figures 1 and 2;

Figure 4 is an end view showing the relative arrangement of the several plate members which make up the improved chuck assembly shown in Figure 1, with the several parts slightly separated in order to show their form and arrangement.

Figure 5 is a rear view of part of the vise control assembly shown in Figures 1 and 2;

Figure 6 is a partial sectional view of the part of the chuck control assembly shown in Figure 5; and Figure 7 is a partial sectional view of a modified type of chuck wherein the chuck grip overhangs the work carriage for a considerable distance.

Referring to Figures 1, 2, 3 and 4, the chuck or work holding unit is seen to consist of a rear plate 10 which is mounted on a carriage 100 of a metal working machine such as a thread-cutting machine (not shown), a middle plate 11 which has a vertical "float" with respect to the rear plate 10, and a front plate 12 which has a limited horizontal "float" with respect to the middle plate 11. As will be readily understood, the carriage 100 is arranged for movement along suitable guiding means on the machine to feed work pieces toward and away from a rotating cutting tool. The front plate 12, therefore, has a limited play both vertically and horizontally with respect to rear plate 10, and the carriage 100, and carries right and left-end jaw blocks 14, 15 in which are mounted the jaws 16, 16. These jaws are held in the jaw blocks by the bolts 17, 17. Gibs 18 are fastened to front plate 12 by means of screws 20 and serve to retain jaw blocks 14, 15 in the plate.

Rear plate 10 is fastened to carriage 100 by means of washers 21 and bolts 22, the back surface 23 of the plate 10 resting against a front face of the carriage 100, see Figure 2. Plate 10 has a rearwardly projecting upper rim or flange 25 in which are located two dog screws 26 which abut against the top 101 of carriage 100. Screws 26 are used to make an initial vertical adjustment of the chuck assembly with respect to the carriage 100. Holes 102 in the carriage 100, through which the bolts 22 pass, are sufficiently large to permit such an adjustment. Carriage 100 is provided with side lugs 103 extending forwardly and which incorporate dog screws 104 which abut sides 28 and 29 of rear plate 10 of the chuck assembly, see Figure 1. Thus the chuck assembly can also be initially adjusted in a horizontal direction with respect to the carriage 100. This initial positioning feature makes it possible to approximately center the jaw blocks 14, 15 with respect to the carriage, and hence with the rotational axis of the tool carried by the machine, to thereby reduce the amount of lateral, or sidewise, play necessary between the plates of the chuck to permit the self-aligning of work which is considerably off-center.

Key blocks 30, 30 are fastened to rear plate 10 by pins 31, 31. These blocks fit snugly within vertical keyways 33, 33 of the middle plate 11, and are so arranged as to permit plate 11 to have a certain amount of vertical play with respect to the plate 10. Similar key blocks 37, 37 are held on plate 12 by pins 38, 38 and fit in horizontal keyways 40, 40 of plate 11. These latter blocks are so spaced as to permit a certain amount of horizontal play of the plate 12 with respect to the plate 11. Studs 42 are located in front plate 12 and are used in conjunction with nuts 43 to draw the entire chuck or work holder assembly back against the carriage 100; however, sufficient longitudinal looseness or clearance is left between the plates to permit them to slide with respect to each other without undue friction. Lock nuts 44 are used to maintain a desired longitudinal clearance by eliminating the possibility of having the nuts 43 move from their adjusted position. Washers 45 are located between plate 10 and nuts 43 to obtain a larger bearing area and thereby to further reduce the friction. The holes 46, 47 and 105, through which studs 42 extend, are sufficiently large so as not to interfere with the "floating" motion of plate 12.

As will be seen, the entire weight of front plate 12 and its chuck or vise assembly is transmitted to the middle plate 11 by means of the keys 37 and keyways 40. Middle plate 11 extends beyond plates 12 and 10 and has two counter-bored holes 50, 50 in which are located springs 51 and 52, spring 51 being the one which is nearer to a vise handle or hand wheel 70. Spring 51 has a larger spring constant than does spring 52, for it must overcome the torque set up by the unbalanced weight of the vise hand wheel 70.

The tension of the springs 51, 52 can be varied by adjusting threaded retaining plugs 53, 53 to the desired position. Springs 51 and 52 rest against enlarged heads of small pins 54, 54 and are designed to hold plate 11 in the position shown in Figures 2 and 4, i. e., about mid-way of its range of vertical movement. These pins slide vertically in constricted bores of holes 50, 50 and abut surfaces 55, 55 of lugs 56, 56 located on the rear plate 10. Thus the entire weight of the vise or chuck assembly is transmitted to the carriage 100 by the dog screws 26 which abut the top 101 of the carriage 100 while the plates 11 and 12 are, in effect, resiliently mounted on the carriage 100 by springs 51, 52.

In installations where it is necessary that the chuck assembly overhang the carriage for a considerable distance, a modified form of assembly, shown in Figure 7, may be employed. This assembly differs from the previous one in that plate 10' has a recess 49' which decreases the weight of the plate and thereby reduces the load on dog screws 26'. This weight reduction is an important factor where the amount of overhang is considerable. A spacer washer or bushing 48' is provided so as to enable washer 45 to bear against plate 10' and to have the nuts 43' and 44' exposed so as to eliminate need for a socket wrench.

The use of this type of assembly is especially effective where the carriage 100' has a face configuration which would normally necessitate making the surface 23' of plate 10' lie in several parallel but offset planes. Actually the plate 10' need only have upper and lower contact areas or surfaces 23', as shown in Figure 7, for cooperation with similar surfaces on the carriage, and recess 49' is employed to clear the remaining carriage face surfaces. In this modification bolts, not shown but which would correspond to bolts 22 of Figure 4, are used to hold the contact surfaces 23' against the cooperating faces of carriage 100'.

With reference to Figures 1, 2, 6 and 7 the mechanism for operating the work holding device will now be explained. Hand wheel 70 is fitted loosely around an outside cylindrical surface of a knocker arm member 72. The hand wheel is preferably made of considerable mass, conveniently concentrated in the rim of said wheel, for a reason which will be explained later. Member 72 is keyed to a vise screw shaft 74 by means of a key 75. Hand wheel 70 and member 72 are held on shaft 74 by a retaining washer 77 and screw 78. Shaft 74 projects through bore 80 of a box on a bracket member 82 carried by plate 12. The member 72 fits closely against a face 84 of the bracket 82, and a ring 85 is secured on screw shaft 74 to abut the face 87 of member 82.

Thus, shaft 74 has very little end play. Right and left-hand screw threads 89—90 are cut on shaft 74 and on these threads are placed vise nuts 92, 92 fitted into jaw blocks 14, 15. Accordingly, turning the shaft 74 clockwise, Figure 2, causes jaws 16, 16 to tighten, while turning it counter-clockwise will effect an opening of said jaws. Shaft 74 fits in bores 93, 93 of jaw blocks 14, 15 and is provided with enlarged integral sealing rings or projections 94, 94 used to prevent entry of chips or dirt into bore 93, 93.

Hand wheel 70 is provided on one of its faces with two projecting portions or hammer elements 95, 96 which can be used in a manner to be described presently. Knocker arm 72 has an outwardly extended portion carrying abutment surfaces 97, 98. This extended portion lies between the hammer elements 95, 96 of the hand wheel as will be apparent. These abutment surfaces are, as will be seen from Figure 5, normally spaced considerably from the hammer surfaces or elements 95, 96 of the hand wheel. Thus, by turning the wheel clockwise the surface 95 can be caused to strike surface 97 and thereby effect a closing of the vise jaws 16, 16 on a work piece W. This closing action will effect a clamping of the work piece by the jamming of the threaded sections 89, 90 against the threads in the vise nuts 92, 92.

To open the jaws, a reverse action is necessary and, by spinning wheel 70, surface 96 is caused to strike the surface 98 with a considerable force and thereby the frictional locking which is secured when the jaws are closed may be readily overcome. As will be appreciated by moving the hand wheel vigorously a considerable amount of energy can be stored therein so that when the hammer element 96 strikes the surface 98 it exerts a considerable force thereon and much more than could be applied by merely a steady pull on the hand wheel. Accordingly, the vise jaws can be released readily even after having been very firmly tightened against the work piece. This may be done by striking the surface 98 a series of small sharp blows by the surface 96. Preferably in closing the jaw blocks on the work piece a steady pull on the hand wheel is employed. However, where an unusually tight grip is desired, the clamping action can be greatly increased by striking hammer 95 against surface 97.

From the foregoing description of a preferred embodiment of my invention, it will be seen that my improved work holding device is operable to securely hold a work piece in proper position on a machine tool, such as a threading machine, in a very firm and rigid manner while at the same time allowing a slight, but sufficient, bi-lateral self-centering action of the vise or chuck assembly. It will also be apparent that the work holding mechanism is of simple construction so that it may be readily fabricated and also that it is of such a character as to be adaptable for use on different types of machine carriages without any modification of such carriages.

It is also significant to note that the operating means for the clamping screw provides for both an improved clamping as well as releasing action of the vise jaws. This latter is due to the lost motion connection between the weighted hand wheel and the lead screw. As will be observed, this lost motion connection makes it possible to store energy in the hand wheel for applying an impact blow or torsional surge in the lead screw for either tightening the jaw clamps by means of the lead screw or for loosening them when it is desired to remove a work piece. This latter feature is of considerable importance from a practical standpoint since it is clear that a great deal of physical labor is saved the machine operator while at the same time the work pieces can be very firmly and strongly gripped by the jaws. Also, it will be observed that the springs 51 and 52 are arranged so that the work holding vise assembly is resiliently mounted upon the carriage or rather upon the back plate of the work holding assembly and that the springs automatically hold the vise in approximately vertically centered relation to the rotating tool. These springs provide a slight cushioning action which is, of course, beneficial.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A work holding device, for use in a metal working machine, comprising a plurality of elongated plate members; one of said plate members being adapted to be adjustably mounted on a carriage; another of said members carrying a work gripping means and an operating device for said work gripping means; an intermediate plate member; cooperating guiding means on said plate members operable to allow bilateral movement of said second-named member parallel to the plane of said first-named member; and means to hold said members in assembled relation.

2. A work holding device, comprising; three relatively movable members mounted in face-to-face relation; cooperating guiding means on said members for limiting their movement to parallel planes and in two directions at right angles to each other; work engaging means associated with one of said members and means for operating said engaging means; said operating means including a frictional clamping device and an impact releasing means therefor.

3. A work holding device, for use in a machine tool, comprising; a plurality of elongated plate members arranged in face-to-face and consecutive relation; means associated with one of said members for securing it to a carriage; projecting portions on said last-named member, said projections being received in cooperating recesses on an intermediate member for guiding said intermediate plate for movement in a given direction on said first-named member; the other of said members carrying similar projections received in other recesses in said intermediate member for guiding said other member for movement on said intermediate member in a direction at right angles to said first-named direction; work holding means on said other member; and means for holding said members in assembled relation while permitting said movements.

4. A work holding device, comprising, a first end member, an intermediate member, and a second end member; work clamping means associated with said first end member; means carried by said second member for mounting said device on a machine tool carriage with said clamping means substantially centered with respect to the rotational axis of a cutting tool; means for mounting said first end member on said second end member for self-centering movement of said clamping means with respect to said axis, said last-named mounting including cooperating guiding means on said members arranged to allow transverse movement of said intermediate member on said second end member in one direction and to allow transverse movement of said first end member on said intermediate member in a direction at right angles to said first direction; and means for holding said members in assembled relation.

5. In a work holding device the combination as set forth in claim 4, wherein said intermediate member is guided for vertical movement on said second end member and resilient means are provided for holding said intermediate member substantially mid-way of its range of movement.

6. A work holding device, comprising, two end members and an intermediate member; means for holding said members in face-to-face relation while permitting relative sliding movement therebetween, said means including cooperating keys and grooves; said grooves being formed in said intermediate member and including two sets at right angles to each other; said keys and grooves being so arranged that said intermediate member is free to slide in one direction on one of said end members and said other end member is free to slide on said intermediate member at right angles to said first direction, and means for resiliently holding said intermediate plate member substantially at the mid-point of its range of movement.

7. A work holding device, comprising, a rear plate member, an intermediate plate member, and a front plate member; means associated with said rear member for adjustably securing it to a carriage; vertically offset key elements carried on a face of said rear member; cooperating vertically extending key slots formed in said intermediate member adapted to receive said key elements and guide said intermediate member for vertical sliding movement on said face of said rear member; horizontally offset key elements carried by a face of said front member; cooperating horizontally extending key slots formed in said intermediate member adapted to receive said last-named key elements and guide said front member for horizontal movement on said intermediate member; means for holding said members in assembled relation, said last-named means being adapted to permit said movements of said front and intermediate plate members whereby said front member can move horizontally and vertically with respect to said carriage, and a work holding mechanism carried by said front member.

8. In a work holding device, the combination set forth in claim 7, wherein said rear member is provided with outwardly extending projections and said intermediate member carries spring pressed plunger members cooperating with said projections for holding said front member substantially in mid-point position with respect to said rear member.

9. In a work holding device, comprising, a plate member and means for mounting said member on a carriage for self-centering movement; a pair of opposed work holding jaw members slidably mounted in said plate member; a right and left-hand screw member journalled in said plate member and associated with said jaw members so as to open and close the same; means for rotating said screw, including, a hand wheel journalled thereon, an arm member secured to said screw and extending radially therefrom adjacent to said wheel; means on said wheel spaced from opposite sides of said arm, said last-named means being adapted to be brought into contact with said arm to turn said screw after a predetermined rotation of said wheel.

10. In a work holding device; a pair of opposed jaw members; means for operating said jaw members to open and closed positions, said means including a lead screw; a hand wheel journalled on said screw; arcuately spaced abutment surfaces carried by a face of said wheel; a radially extending member fixed to said screw; said last-named member having a portion extending between said abutment surfaces and spaced considerably therefrom, whereby said jaw members may be readily opened by rotating said wheel to cause one of said abutment surfaces to forcibly strike said portion.

11. In a work holding device, a plate member; a pair of opposed jaw members slidably mounted in said plate member; a journal portion on said plate member having opposed side faces; a lead screw journalled in said journal portion and associated with said jaw members for opening and closing the same; an abutment means carried by said lead screw cooperating with one of said side faces; a sleeve member keyed to said screw and cooperating with the other of said side faces; a hand wheel journalled on said sleeve member; radially disposed and arcuately spaced hammer elements carried by said hand wheel; and an arm extending from said sleeve member having opposed abutment faces disposed between said hammer elements and normally spaced therefrom, whereby said lead screw can be rotated by repeated blows of one or the other of said hammer elements on the adjacent abutment face of said arm.

12. In a work holding device, comprising, a plurality of relatively movable plate members; an end plate member; means associated with said end plate member for holding said members in assembled relation; a pair of substantially flat parallel contact surfaces on said end plate member, said contact surfaces being spaced apart and located in parallel offset planes and adapted to engage correspondingly parallel and offset cooperating supporting surfaces on a carriage element; and means for securing said end plate member on said carriage with said contact surfaces engaging said supporting surfaces.

13. In a work holding device, a plurality of relatively movable plate members; an end plate member; means associated with said end plate member for holding said members in assembled relation, a pair of spaced contact surfaces on said end plate member adapted to engage correspondingly shaped cooperating supporting surfaces on a carriage element; one of said contact surfaces being located either side of said means for holding said members in assembled relation; and means, located intermediate said contact surfaces and said cooperating supporting surfaces, for securing said end plate member on said carriage with said contact surfaces engaging said supporting surfaces.

14. The device defined in claim 13, wherein said end member is provided adjacent one of said contact surfaces with a flange disposed normal to the latter and overhanging said carriage element, and means threaded into said flange for adjusting the latter towards and away from said carriage element in a direction parallel to said contact surfaces.

15. In a work holding device, a plate member; means mounting said plate member on a carriage for self-centering movement; a pair of opposed jaw members slidably mounted in said plate member; means for operating said jaw members to open and closed positions, said means including a lead screw; a hand wheel journaled on said screw; arcuately spaced abutment surfaces carried by a face of said wheel; a radially extending member fixed to said screw; said last-named member having a portion extending between said abutment surfaces and spaced considerably therefrom, whereby said jaw members may be readily opened by rotating said wheel to cause one of said abutment surfaces to forcibly strike said portion.

16. In a work holding device, a plate member; means mounting said plate member on a carriage for self-centering movement; a pair of opposed jaw members slidably mounted in said plate member; a journal portion on said plate member having opposed side faces; a lead screw journaled in said journal portion and associated with said jaw members for opening and closing the same; an abutment means carried by said lead screw cooperating with one of said side faces; a sleeve member keyed to said screw and cooperating with the other of said side faces; a hand wheel journaled on said sleeve member; radially disposed and arcuately spaced hammer elements carried by said hand wheel; and an arm extending from said sleeve member having opposed abutment faces disposed between said hammer elements and normally spaced therefrom, whereby said lead screw can be rotated by repeated blows of one or the other of said hammer elements on the adjacent abutment face of said arm.

SAMUEL W. MATHIAS.